United States Patent
McInerney et al.

(10) Patent No.: US 11,699,026 B2
(45) Date of Patent: Jul. 11, 2023

(54) SYSTEMS AND METHODS FOR EXPLAINABLE AND FACTUAL MULTI-DOCUMENT SUMMARIZATION

(71) Applicant: salesforce.com, inc., San Francisco, CA (US)

(72) Inventors: Jered McInerney, Brighton, MA (US); Wojciech Kryscinski, Palo Alto, CA (US); Nazneen Rajani, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/589,675

(22) Filed: Jan. 31, 2022

(65) Prior Publication Data
US 2023/0070497 A1    Mar. 9, 2023

Related U.S. Application Data

(60) Provisional application No. 63/240,814, filed on Sep. 3, 2021.

(51) Int. Cl.
*G06F 17/00*    (2019.01)
*G06F 40/166*    (2020.01)
(Continued)

(52) U.S. Cl.
CPC .......... *G06F 40/166* (2020.01); *G06F 40/20* (2020.01); *G06F 40/40* (2020.01); *G06N 5/022* (2013.01)

(58) Field of Classification Search
CPC ........ G06F 40/166; G06F 40/20; G06F 40/40; G06N 5/022
See application file for complete search history.

(56) References Cited

U.S. PATENT DOCUMENTS 7,137,067 B2 * 11/2006 Yanase ................. G06F 40/166
                                                    707/999.005
11,061,951 B2 * 7/2021 Boni .................... G06V 30/416
(Continued)

FOREIGN PATENT DOCUMENTS

CN        109189901 B    * 5/2021

OTHER PUBLICATIONS

Agarwal, Sanchit, et al, "Single-Document Summarization Using Sentence Embeddings and K-Means Clustering", 2019 International Conference on Advances in Computing, Communication Control, and Networking (ICACCCN), pp. 162-165, DOI: 10.1109/ICACCCN.2018.8748762, Oct. 1, 2018. (Year: 2018).*

(Continued)

*Primary Examiner* — Laurie A Ries
(74) *Attorney, Agent, or Firm* — Haynes and Boone, LLP

(57) ABSTRACT

Embodiments described herein provide methods and systems for summarizing multiple documents. A system receives a plurality of documents and generates embeddings of the sentences from the plurality of documents. The embedded sentences are clustered in a representation space. Sentences from a reference summary are embedded and aligned with the closest cluster. Sentences from each cluster are summarized with the aligned reference sentences as a target. A loss is computed based on the summarized sentences and the aligned references, and the natural language processing model is updated based on the loss. Sentences may be masked from being used in the summarization by identifying sentences that are contradicted by other sentences within the plurality of documents.

17 Claims, 6 Drawing Sheets

(51) Int. Cl.
*G06N 5/022* (2023.01)
*G06F 40/20* (2020.01)
*G06F 40/40* (2020.01)

(56) References Cited

U.S. PATENT DOCUMENTS

| | | | | |
|---|---|---|---|---|
| 11,170,169 | B2* | 11/2021 | Patel | G06F 40/295 |
| 2009/0300486 | A1* | 12/2009 | Zhu | G06F 16/345 |
| | | | | 704/9 |
| 2015/0006528 | A1* | 1/2015 | Rao | G06F 16/345 |
| | | | | 707/730 |
| 2020/0175114 | A1* | 6/2020 | Dechu | G06F 16/367 |
| 2020/0242299 | A1* | 7/2020 | Ekmekci | G06F 40/30 |
| 2021/0117617 | A1* | 4/2021 | Blaya | G06F 40/253 |
| 2021/0192125 | A1* | 6/2021 | Deibler | G06F 40/166 |
| 2021/0326523 | A1* | 10/2021 | Walters | G06N 3/0445 |
| 2022/0067269 | A1* | 3/2022 | de Oliveira | G06F 40/35 |
| 2022/0067285 | A1* | 3/2022 | Sellam | G06F 40/51 |
| 2022/0129625 | A1* | 4/2022 | Zucker | G06F 40/279 |
| 2022/0245345 | A1* | 8/2022 | Jain | G06V 30/413 |
| 2022/0318522 | A1* | 10/2022 | Wolf | G06F 40/279 |

OTHER PUBLICATIONS

PEGASUS: Pre-training with Extracted Gap-sentences for Abstractive Summarization. arXiv preprint arXiv: 1912.08777. Jul. 10, 2020 (55 pgs).

\* cited by examiner

| Model | Truncate | ROUGE | | |
|---|---|---|---|---|
| | | 1 | 2 | L |
| Concat (baseline) | None | 43.32 | 22.08 | 36.65 |
| K-means (5) | None | 31.88 | 17.74 | 26.45 |
| Spectral (5) | None | 35.49 | 18.4 | 29.13 |
| K-means (5) + filter | None | 42.32 | 21.87 | 34.37 |
| Spectral (5) + filter | None | 41.83 | 21.98 | 35.04 |
| Spectral (5) + filter | Top 10 | 35.9 | 17.23 | 29.36 |
| Spectral (5) + filter | Top 10 | 39.58 | 20.2 | 32.71 |
| Spectral (5) + filter + Oracle rank | Top 10 | 45.61 | 24.7 | 38.54 |
| Full Oracle Clustering | All | 47.72 | 25.88 | 39.98 |

*FIG. 5*

| Using finetuned t5 for checkpointing / entailment prediction | Rouge-1 | Bert score f1 | Article entailment (finetuned t5) | Cluster entailment (finetuned t5) | Hallucination rate (now using entailment predictions) | article FEQA | cluster FEQA |
|---|---|---|---|---|---|---|---|
| Baseline | 0.27403 | 0.87604 | 0.55191 | 0.19333 | 0.09333 | 0.25424 | 0.25422 |
| Baseline, mask not entailed | 0.25316 | 0.87203 | 0.55191 | 0.18 | 0.11333 | | |
| Baseline, mask not entailed (during training) | 0.26839 | 0.87257 | 0.53916 | 0.17333 | 0.11333 | | |
| Baseline, mask random oracle (using baseline model) | 0.26498 | 0.87363 | 0.58831 | 0.2 | 0.1 | | |
| Baseline, mask random oracle (using clustering model) | 0.2708 | 0.87428 | 0.55556 | 0.19333 | 0.12 | | |
| Clustering | 0.26366 | 0.87218 | 0.54827 | 0.18667 | 0.09333 | 0.27547 | 0.27328 |
| Clustering, mask not entailed | 0.25714 | 0.87014 | 0.5592 | 0.18 | 0.09333 | | |
| Clustering, mask not entailed (during training) | 0.24784 | 0.86587 | 0.58831 | 0.20667 | 0.08 | 0.272 | 0.26938 |
| Clustering, mask random oracle (using baseline model) | 0.26112 | 0.87076 | 0.54463 | 0.17333 | 0.1 | | |
| Clustering, mask random oracle (using clustering model) | 0.2599 | 0.86926 | 0.64663 | 0.24667 | 0.04667 | 0.27659 | 0.27217 |

*FIG. 6*

SYSTEMS AND METHODS FOR EXPLAINABLE AND FACTUAL MULTI-DOCUMENT SUMMARIZATION

CROSS REFERENCES

The present disclosure is a nonprovisional of and claims priority under 35 U.S.C. 119 to U.S. provisional application No. 63/240,814, filed on Sep. 3, 2021, which is hereby expressly incorporated by reference herein in its entirety.

TECHNICAL FIELD

The embodiments relate generally to machine learning systems and multi-document summarization.

BACKGROUND

Summarizing large amounts of information from many sources into concise snippets can be incredibly useful, but current neural summarization techniques still have many factual errors making these techniques hard to use in practice. Additionally, current techniques do not provide an explanation for a user to determine how the summary was developed.

BRIEF DESCRIPTION OF THE DRAWINGS

FIG. 5 provides an example table illustrating example performance of different clustering methods.

FIG. 6 provides an example table illustrating example performance of different multi-document summarization methods discussed herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Embodiments described herein provide a multi-document summarization approach that is factual and explainable. Summarizing large amounts of information from many sources into concise snippets can be incredibly useful, but current neural summarization techniques still have many factual errors making these techniques hard to use in practice.

In multi-document summarization, a document can be fact checked by making use of the other documents in a document cluster. a clustering model is adopted to cluster sentences from various documents into a plurality of clusters, to use as an input for an abstractive model. A reference summary may then be aligned with the plurality of clusters by comparing each sentence from the reference summary with the clusters, e.g., using a pretrained model to generate cluster-wise reference summary for each cluster. Next, source sentences in each of the original documents are aligned with a closest reference sentence in the reference summary. Then the clustering among the source sentences can be transformed into a partition of the reference summary. The partition of the reference summary is then compared with the cluster-wise reference summary to finetune the clustering model.

Sentences which are identified as contradicted by another document may be masked so that they are not used as inputs to the summary. In order to improve explainability, masked out sentences may be identified to a user in an interface. The interface may also be used to visualize the clustering and summarization models, for example by displaying verified and contradicted sentences in the source documents.

In particular, masking out words or sentences from one article based on closely related sections of the other articles can lead to a summary that is more consistent with and faithful to all of the source documents and contains less hallucinations overall while still remaining fluent and similar in content to the reference summaries. In addition, this masking represents a valuable and interpretable explanation for the summary.

Figure 1:
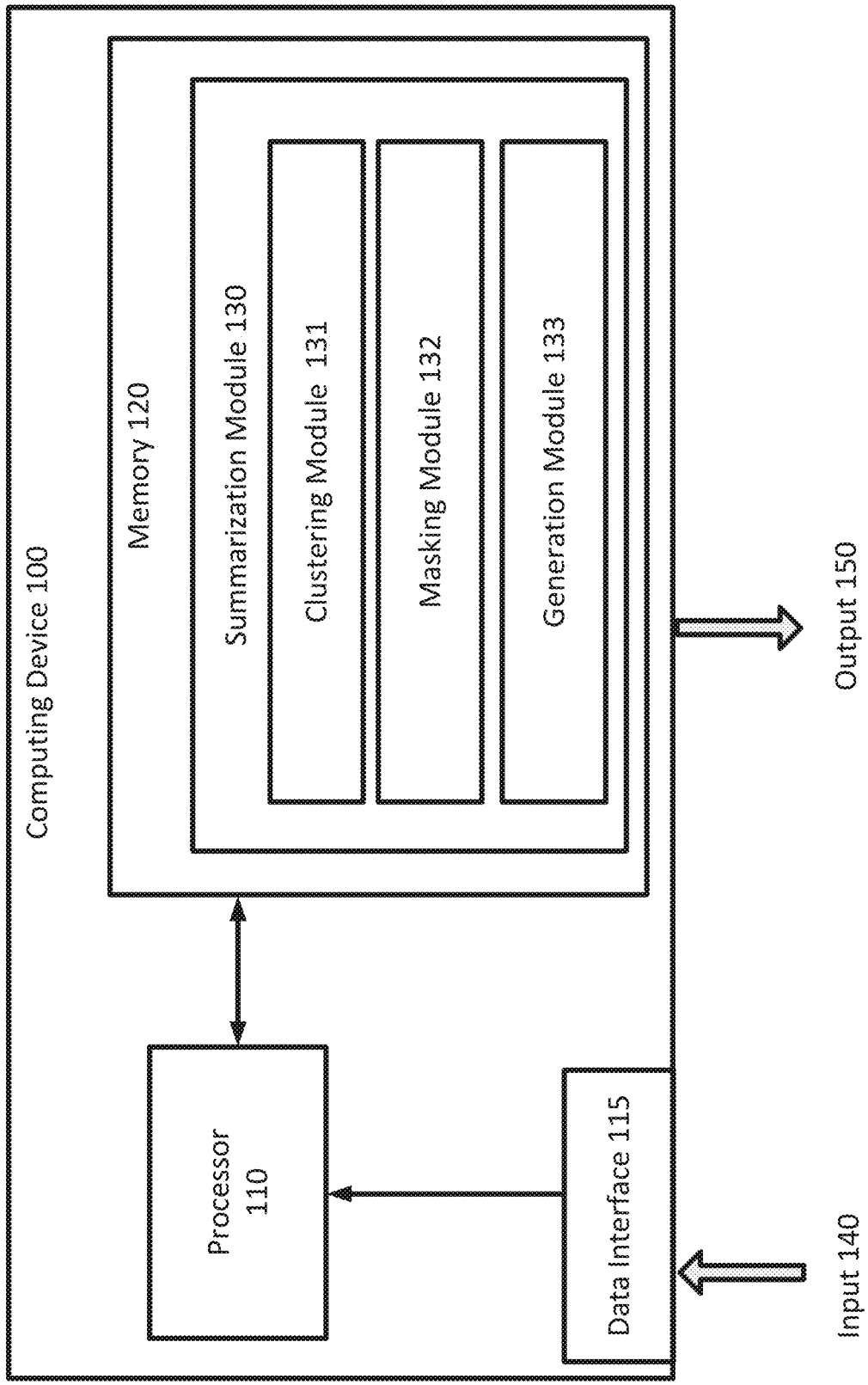
FIG. 1 is a simplified diagram of a computing device that performs multi-document summarization.

FIG. 1 is a simplified diagram of a computing device that implements the multi-document summarization, according to some embodiments described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a Summarization module 130 that may be used to implement and/or emulate the systems and models, and/or to implement any of the methods described further herein. In some examples, the Summarization module 130, may receive an input 140, e.g., such as a collection of documents on a particular topic, via a data interface 115. The data interface 115 may be any of a user interface that receives a question, or a communication interface that may receive or retrieve previously stored documents from the database. The Summarization module 130 may generate an output 150, such as a summary of the input 140.

In some embodiments, the Summarization module 130 may further includes the clustering module 131, masking module 132, and a generation module 133. The clustering module 331 may be configured to use an encoder to generate an embedding of the sentences from the source documents, and then cluster those embedded sentences according to their relative distance in the representation space. A variety of clustering methods may be used such as K-means clustering or spectral clustering. K-means clustering partitions the sentences into K clusters in which each sentence belongs to the cluster with the nearest centroid. Spectral clustering clusters embedded sentences by identifying groups based on closeness between neighbors allowed for clusters that are aspherical. The masking module 132 is configured to mask sentences. Embedded sentences from each document may be compared to each other in order to find sentences which contradict each other. The masking module may be configured to mask those contradicted sentences that it identifies. The masking is done so that those contradicted sentences will not later be used in the generation of a summary, as they may contain information that is not factual. The generation module is configured to generate a summary of the documents based on the clustered and masked sentences. The generation model may be trained by first aligning sentences from a reference summary with the identified clusters. This may be done by embedding the sentences of the reference summary and finding the closest cluster in the representation space. The clustered sentences from the source documents may then be summarized with the target of the reference sentences aligned with each respective cluster. A loss may be computed based on the generated summary sentences and the reference sentences aligned with the cluster used to generate each respective summary sentence.

Some examples of computing devices, such as computing device 100 may include non-transitory, tangible, machine readable media that include executable code that when run by one or more processors (e.g., processor 110) may cause the one or more processors to perform the processes of methods described herein. Some common forms of machine readable media that may include the processes of methods described herein are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
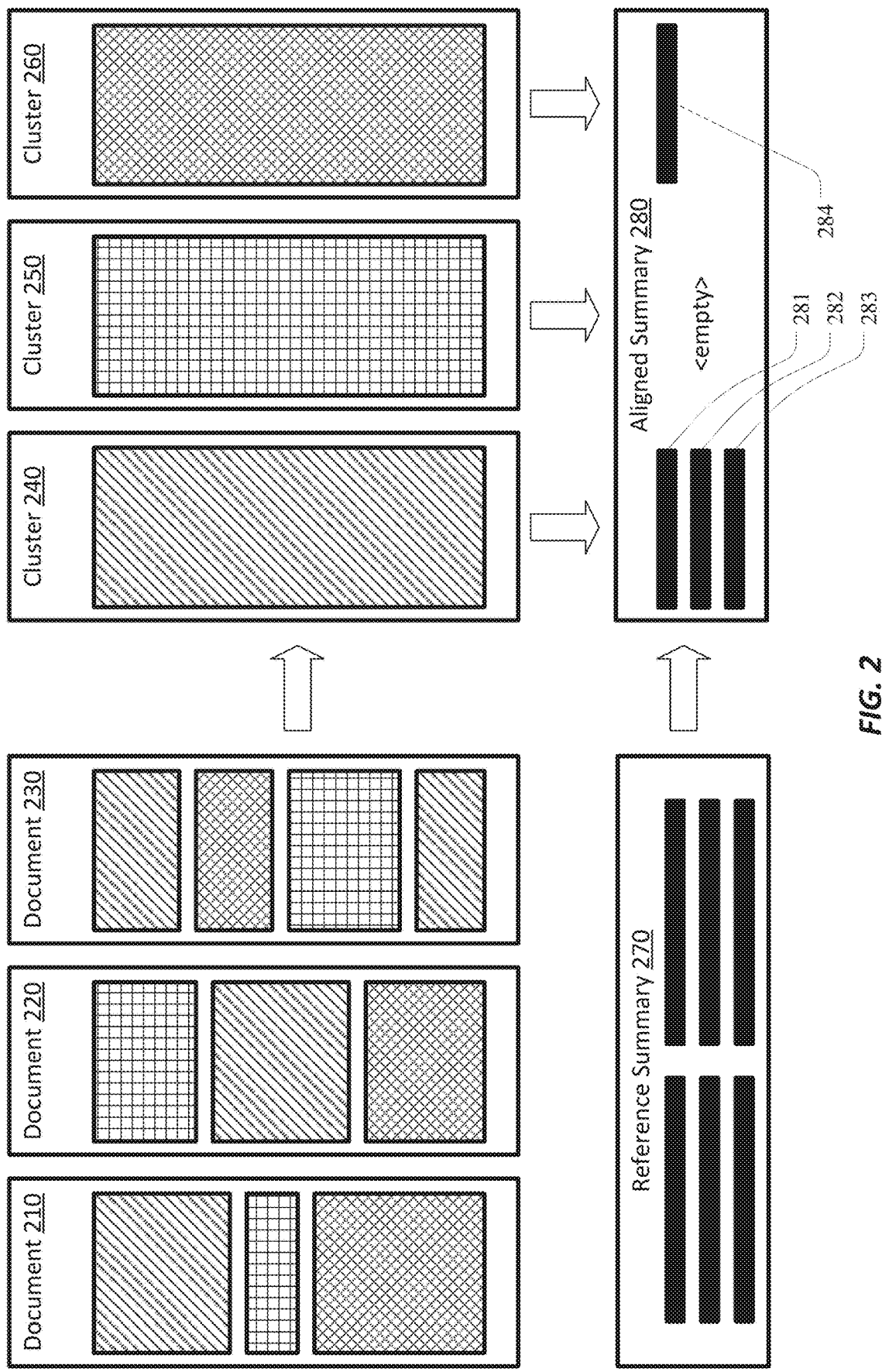
FIG. 2 is a simplified diagram showing an example method for summarizing multiple documents.

FIG. 2 is a simplified diagram showing an example method for summarizing multiple documents. Documents 210, 220, and 230 are multiple input documents, e.g., having text that covers similar material. Greater or fewer documents may be used in the methods described herein. Reference summary 270 is a summary of the documents, created either manually or otherwise. As is shown by the different hashings, portions of each document may describe the same or similar matter. For example, Document 210 may have a sentence that says, "The town parade will begin at 2:00," and Document 220 may have a sentence that says, "The parade starts at 2:00." Embeddings of the sentences from the source Documents 210, 220, and 230 may be generated, and then those embeddings may be clustered together based on their relative distance in the representation space, as opposed to grouped according to which document they are from. This is shown as Clusters 240, 250, and 260 which show that the similar sentences of each of the source documents 210, 220, and 230 are clustered together. As is illustrated, the sentences are divided into three clusters, however greater or fewer clusters may be used. A number of clustering methods may be used. For example, K-means clustering may be performed which partitions the sentences into K clusters in which each sentence belongs to the cluster with the nearest centroid. Another clustering method which may be used is Spectral clustering, which clusters embedded sentences by identifying groups based on closeness between neighbors allowed for clusters that are aspherical.

Sentences from the reference summary 270 may also be encoded into embeddings and then those embeddings are compared with embeddings of the clusters 240 250 and 260. In this way, sentences in the reference summary 270 may be respectively aligned with one of the identified clusters. As shown, multiple reference summary sentences may be aligned with a single cluster, such as in the illustrated example, sentences 281, 282, and 283 are aligned with cluster 240, or in some cases a cluster may have no reference sentences aligned with it, such as cluster 250 in the illustrated example. Sentence 284 in the illustrated example is the only sentence from reference summary 270 which is aligned with cluster 260. Aligning may be performed, for example, by choosing the closest cluster to each reference sentence, using Euclidean distance between the mean sentence embedding of the cluster and the sentence embedding of the reference sentence.

In one embodiment, a pretrained summarization model may be used to generate cluster-wise summaries from clusters 240, 250 and 260, respectively. The generated cluster-wise summaries may then be compared with the reference sentences 281-284 in the aligned summary 280 aligned with the cluster. As such, a loss function may be computed based on the generated cluster-wise summary and the aligned reference sentence(s) 281-284. This loss function may be used to update parameters of the pretrained summarization model.

Figure 3:
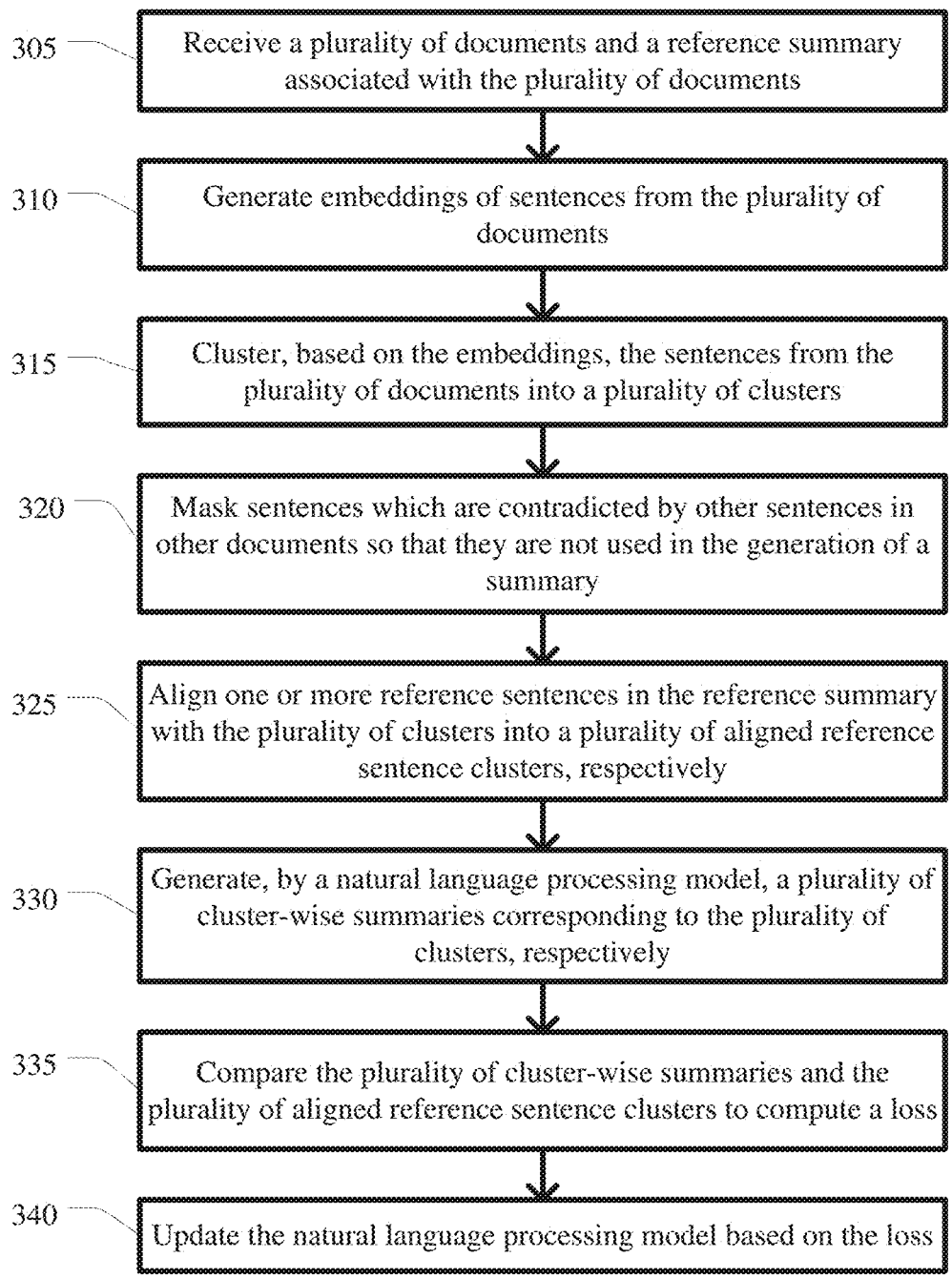
FIG. 3 provides an example logic flow diagram illustrating an example algorithm for training a multi-document summarization system.

FIG. 3 provides an example logic flow diagram illustrating an example algorithm for training a multi-document summarization system. One or more of the processes described in FIG. 3 may be implemented, at least in part, in the form of executable code stored on non-transitory, tangible, machine-readable media that when run by one or more processors may cause the one or more processors to perform one or more of the processes 305-340. In some embodiments, method 300 may correspond to the method used by the module 130 in FIG. 1.

At step 305, a plurality of documents and a reference summary associated with the plurality documents are received. Method 300 is described as receiving a plurality of documents with a single reference summary. In other aspects, multiple groups of documents may be received, each group having its own corresponding reference summary. Training of the model as described below may occur with documents either all together or in batches in order to train more efficiently.

At step 310, embeddings of sentences from the plurality of documents are generated.

At step 315, The sentences from the plurality of documents are clustered, based on the embeddings, into a plurality of clusters. A number of clustering methods may be used. For example, K-means clustering may be performed which partitions the sentences into K clusters in which each sentence belongs to the cluster with the nearest centroid. Another clustering method which may be used is Spectral clustering, which clusters embedded sentences by identifying groups based on closeness between neighbors allowed for clusters that are aspherical.

At step 320, Sentences are masked which are contradicted by other sentences in the other documents so that they are not used in the generation of a summary. In some aspects, a sentence is only masked when contradicted by multiple other sentences and/or sentences from multiple documents. In addition to masking, the model may be configured to either prefer, or to only use sentences which are verified by other sentences in other input documents.

At step 325, reference sentences from the reference summary are aligned with the plurality of clusters into a plurality of aligned reference sentence clusters, respectively. In order to align, sentences from the reference summary may also be embedded the same way the sentences from the source documents were embedded. Aligning may be performed, for example, by choosing the closest cluster to each reference sentence, using Euclidean distance between the mean sentence embedding of the cluster and the sentence embedding of the reference sentence.

At step 330, a natural language processing model is used to generate a plurality of cluster-wise summaries corresponding to the plurality of clusters, respectively. For example, a pre-trained "PEGASUS" model may be used to generate the summaries. Clusters may be filtered out before the summaries are generated, meaning clusters with no aligned reference sentences associated with them are not used to generate cluster-wise summaries. When generating cluster-wise summaries, the model may only use a subset of the sentences in a cluster, for example the 10 sentences closest to the mean of the cluster. Other methods of selecting a subset of sentences from a cluster include "Oracle" ranking where instead of truncating to the sentences closest to the mean, you truncate to the sentences closest to the cluster's reference summary. When the method performs the masking step, sentences which are masked based on a contradiction are not used in generating a summary.

At step 335, the plurality of cluster-wise summaries and the plurality of aligned reference sentence clusters are compared to compute a loss.

At step 340, The natural language processing model is updated based on the computed loss.

Figure 4:
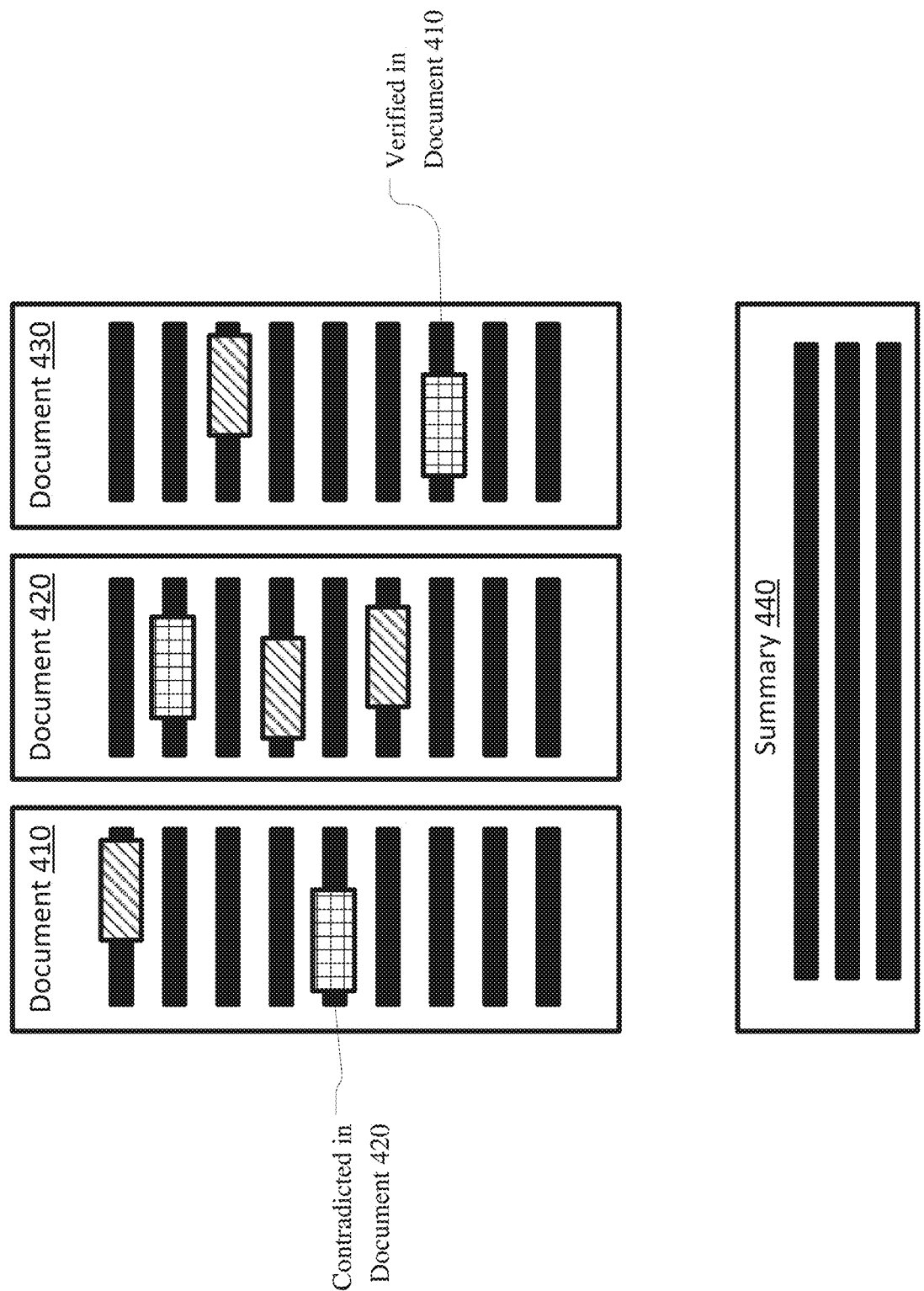
FIG. 4 provides a simplified illustration of a user interface according to some embodiments.

FIG. 4 provides a simplified illustration of a user interface (UI) according to some embodiments. As illustrated, the UI may have some representation of input documents 410, 420, and 430. Sentences which are contradicted (and therefore masked), may be indicated as such. Sentences which are verified by other documents may also be indicated. Some indication may also be given in the UI of which sentences are clustered together. The contradictions, verifications, and clusters, may also be shown to correspond with the final generated summary 440. For example, the sentence which is at the centroid of a cluster may have a line drawn from that sentence in the display to the sentence(s) associated with that cluster in the summary 440.

FIG. 5 provides an example table illustrating example performance of different clustering methods. The metric used is ROUGE, which is a set of metrics for evaluating summarization of texts based on a comparison to a reference summary, as described in Lin, ROUGE: A Package for Automatic Evaluation of Summaries, in WAS, pages 1-8, 2004. The results compare a baseline concatenation model, K-means clustering, Spectral clustering, and different methods of filtering clusters and truncating sentences.

FIG. 6 provides an example table illustrating example performance of different multi-document summarization methods discussed herein. Results compare a baseline concatenation model, a clustering model, a clustering model that uses pre-trained entailment models to mask out source sentences, and an "oracle" model that uses a brute force method to obtain oracle masks. Note that article entailment is the percentage of articles that entail the summary as judged by a fine-tuned T5 model, and Cluster entailment is the percentage of instances for which all articles entail the summary as judged by the model. BERTScore measures the models based on their agreement with the reference summary, as described in Zhang et al., BERTScore: Evaluating Text Generation with BERT, pages 1-9, ICLR 2020. Reference summaries may not be entailed by each article individually so they may not have very good article entailment or faithfulness scores. Article FEQA is a metric used to measure faithfulness using question answering. Hallucination rate is the percentage of instances for which none of the articles entail the summary.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a multi-document summarization model, comprising:
   receiving, via a communication interface, a plurality of documents and a reference summary associated with the plurality of documents;
   generating embeddings of sentences from the plurality of documents, wherein the embeddings indicate a relationship between the sentences across the plurality of documents;
   clustering, based on the embeddings, the sentences from the plurality of documents into a plurality of clusters;
   aligning one or more reference sentences in the reference summary with the plurality of clusters into a plurality of aligned reference sentence clusters, respectively;
   masking a first sentence from one of the plurality of documents based on a determination that the first sentence is contradicted by a second sentence of the plurality of documents
   generating, by a natural language processing model without using the first sentence based on the masking, a plurality of cluster-wise summaries corresponding to the plurality of clusters, respectively;
   comparing the plurality of cluster-wise summaries and the plurality of aligned reference sentence clusters to compute a loss; and
   updating the natural language processing model based on the loss.

2. The method of claim 1, wherein the clustering further comprises:
   clustering, based on the embeddings, the sentences from the plurality of documents into a plurality of clusters using K-means clustering.

3. The method of claim 1, wherein the clustering further comprises:
   clustering, based on the embeddings, the sentences from the plurality of documents into a plurality of clusters using Spectral clustering.

4. The method of claim 1, wherein the masking is based on a determination that the first sentence is contradicted by a plurality of sentences of the plurality of documents.

5. The method of claim 1, further comprising:
   generating a composite summary based on the plurality of cluster-wise summaries.

6. The method of claim 5, wherein the composite summary is generated with information about how the composite summary was formed,
   including at least one of:
      information associated with the clustering;
      information associated with the masking; and
      information associated with the generating the cluster-wise summaries or the composite summary.

7. A system for training a multi-document summarization model, the system comprising:
   a memory that stores the multi-document summarization model;
   a communication interface that receives a plurality of documents and a reference summary associated with the plurality of documents; and
   one or more hardware processors that:
      generates embeddings of sentences from the plurality of documents, wherein the embeddings indicate a relationship between the sentences across the plurality of documents;
      clusters, based on the embeddings, the sentences from the plurality of documents into a plurality of clusters;
      aligns one or more reference sentences in the reference summary with the plurality of clusters into a plurality of aligned reference sentence clusters, respectively;
      masks a first sentence from one of the plurality of documents based on a determination that the first sentence is contradicted by a second sentence of the plurality of documents
      generates, by a natural language processing model without using the first sentence based on the masking, a plurality of cluster-wise summaries corresponding to the plurality of clusters, respectively;
      compares the plurality of cluster-wise summaries and the plurality of aligned reference sentence clusters to compute a loss; and
      updates the natural language processing model based on the loss.

8. The system of claim 7, wherein the clustering further comprises:
   clustering, based on the embeddings, the sentences from the plurality of documents into a plurality of clusters using K-means clustering.

9. The system of claim 7, wherein the clustering further comprises:
   clustering, based on the embeddings, the sentences from the plurality of documents into a plurality of clusters using Spectral clustering.

10. The system of claim 7, wherein the masking is based on a determination that the first sentence is contradicted by a plurality of sentences of the plurality of documents.

11. The system of claim 10, wherein the one or more hardware processors further:
    generates a composite summary based on the plurality of cluster-wise summaries.

12. The system of claim 11, wherein the composite summary is generated with information about how the composite summary was formed,
    including at least one of:
       information associated with the clustering;
       information associated with the masking; and
       information associated with the generating the cluster-wise summaries or the composite summary.

13. A processor-readable non-transitory storage medium storing a plurality of processor-executable instructions for training a multi-document summarization model, the instructions being executed by a processor to perform operations comprising:
    receiving, via a communication interface, a plurality of documents and a reference summary associated with the plurality of documents;
    generating embeddings of sentences from the plurality of documents, wherein the embeddings indicate a relationship between the sentences across the plurality of documents;
    clustering, based on the embeddings, the sentences from the plurality of documents into a plurality of clusters;
    aligning one or more reference sentences in the reference summary with the plurality of clusters into a plurality of aligned reference sentence clusters, respectively;
    masking a first sentence from one of the plurality of documents based on a determination that the first sentence is contradicted by a second sentence of the plurality of documents
    generating, by a natural language processing model without using the first sentence based on the masking, a plurality of cluster-wise summaries corresponding to the plurality of clusters, respectively;
comparing the plurality of cluster-wise summaries and the plurality of aligned reference sentence clusters to compute a loss; and
updating the natural language processing model based on the loss.

14. The processor-readable non-transitory storage medium of claim 13, wherein the clustering further comprises:
clustering, based on the embeddings, the sentences from the plurality of documents into a plurality of clusters using K-means clustering.

15. The processor-readable non-transitory storage medium of claim 13, wherein the clustering further comprises:
clustering, based on the embeddings, the sentences from the plurality of documents into a plurality of clusters using Spectral clustering.

16. The processor-readable non-transitory storage medium of claim 13, wherein the masking is based on a determination that the first sentence is contradicted by a plurality of sentences of the plurality of documents.

17. The processor-readable non-transitory storage medium of claim 13, the operations further comprising:
generating a composite summary based on the plurality of cluster-wise summaries.

* * * * *